Dec. 30, 1930.	J. T. ROBINSON ET AL	1,787,170
CREASING AND CUTTING MACHINE
Filed June 6, 1929   2 Sheets-Sheet 1
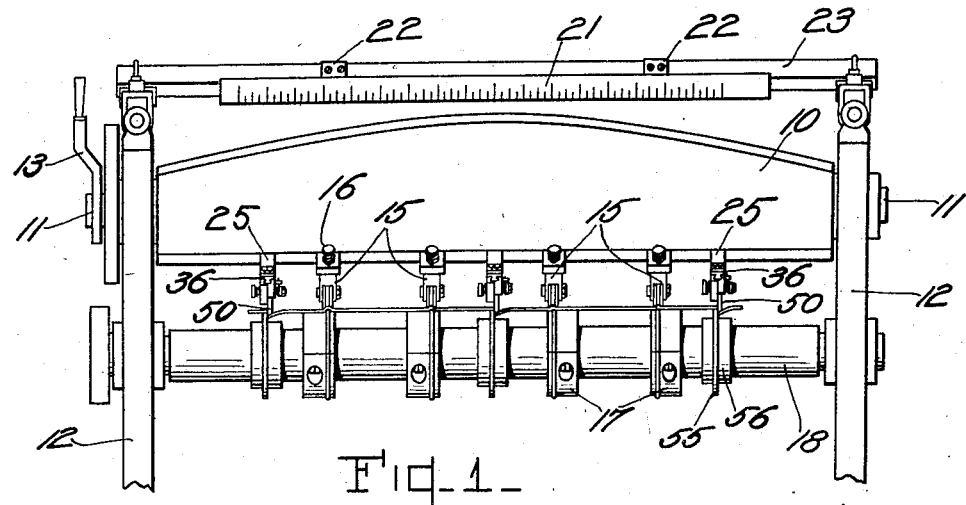
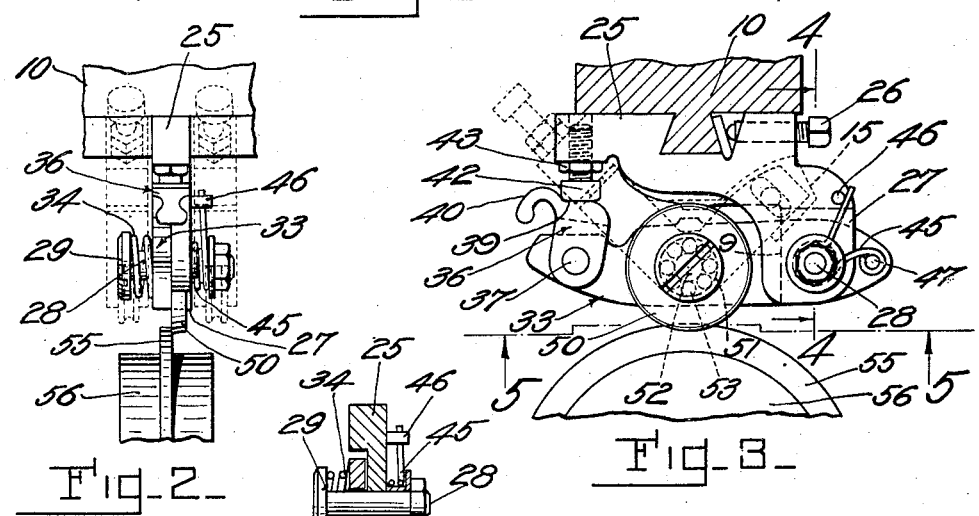
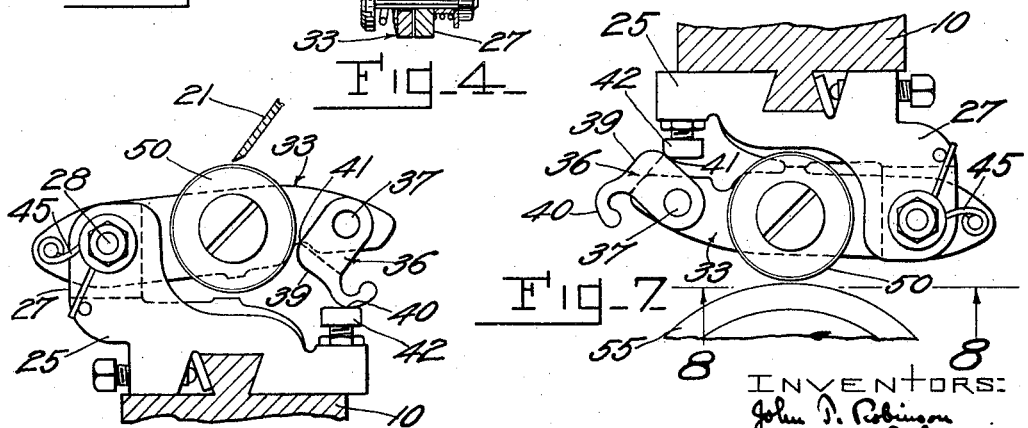
INVENTORS:
John T. Robinson
Horace F. Cook
by Macleod, Calver, Copeland & Dike
Attys.

Dec. 30, 1930.     J. T. ROBINSON ET AL     1,787,170
CREASING AND CUTTING MACHINE
Filed June 6, 1929     2 Sheets-Sheet 2

Patented Dec. 30, 1930

1,787,170

UNITED STATES PATENT OFFICE

JOHN T. ROBINSON AND HORACE F. COOK, OF BOSTON, MASSACHUSETTS, ASSIGNORS TO JOHN T. ROBINSON COMPANY, OF BOSTON, MASSACHUSETTS, A CORPORATION OF MASSACHUSETTS

CREASING AND CUTTING MACHINE

Application filed June 6, 1929. Serial No. 368,979.

The invention is directed particularly to machines of that type which comprises a lower feed roll or shaft, to which power is applied for feeding the stock through the machine, and a bar located above said roll or shaft and having adjustably and interchangeably fixed thereon tools adapted to cooperate with said roll or shaft, or with suitable elements thereon, to crease, score or cut the stock as it passes through the machine, said bar being usually invertible about a longitudinal axis to facilitate the setting of the tools thereon. In machines of this type the cutting elements carried by the bar have usually consisted of discs having peripheral edges which cooperate with or cut against the peripheral surface of the bottom roll or shaft or against the peripheral surfaces of hardened rings secured thereon. While this construction serves adequately for scoring purposes and even, with some classes of stock, for severing the latter for the purpose of trimming and separating the blanks, with other classes of stock it is found not to operate satisfactorily but on the contrary to leave the blanks with ragged edges. In order satisfactorily to sever stock of the latter class a shearing operation is found necessary, and to this end it has been proposed to provide the lower shaft with hardened shearing rings which are engaged laterally and in overlapping relation by cooperating shearing discs carried by the bar. Where such an arrangement of cooperating shearing members is employed it has been found difficult to form and adjust them with the accuracy required in order to cause them to cooperate in such a manner as to shear the stock cleanly. In accordance with one feature of the present invention, the necessity of such accuracy is avoided by providing means whereby said shearing members are pressed resiliently and laterally toward one another. Such an arrangement, however, leads to difficulties when the bar is reversed. At this time, when the cooperating elements are moved out of lateral engagement, the yielding means employed to press them into such engagement will tend to move them into register with one another, so that when the bar is returned to operative position said elements will strike one another with resulting injury to the cutting edges. The invention has, therefore, for further objects to overcome the difficulty last referred to while permitting the use of resiliently pressed cutting elements, and also to provide a construction of cutting element of this type especially adapted for use in machines employing creasing elements between the cutting elements, which construction will permit the setting of the creasing elements relatively close to the cutting elements, as is required in certain classes of work.

The foregoing and other objects of the invention, together with means whereby the latter may be carried into effect, will best be understood from the following description of a preferred embodiment thereof illustrated in the accompanying drawings. It will be undersood, however, that the particular construction described and shown has been chosen for purposes of exemplification merely, and that the invention, as defined by the claims hereunto appended, may be otherwise embodied without departure from the spirit and scope thereof.

In said drawings:

Fig. 1 is a front elevation of a portion of a creasing machine embodying the invention;

Fig. 2 is an enlarged fragmentary front elevation of a portion of the machine showing the improved cutting unit;

Fig. 3 is an end elevation of the portion of the machine shown in Fig. 2;

Fig. 4 is a section taken substantially on the line 4—4, Fig. 3;

Fig. 6 is a fragmentary view of the machine showing the improved cutting device in inverted position;

Fig. 7 is a view similar to Fig. 3 showing the improved cutting device with the cutting wheel in collapsed position.

Figure 8:
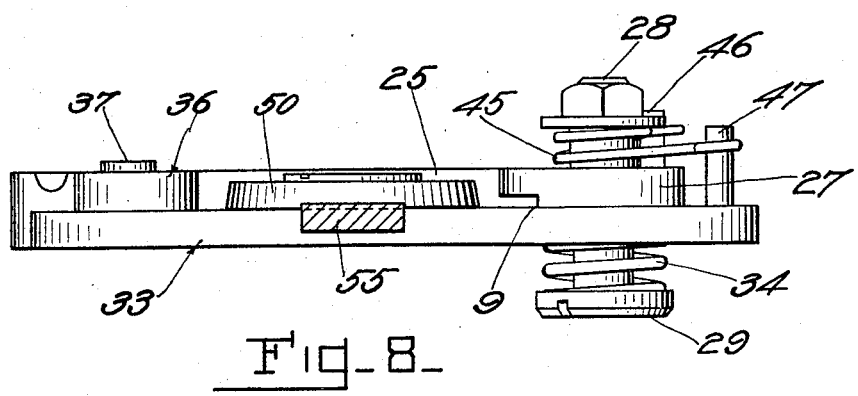
Fig. 8 is a section taken substantially on the line 8—8, Fig. 7.

A machine embodying the invention is illustrated in the accompanying drawings and comprises a bar 10 having trunnions 11 mounted in uprights 12 so that it may be turned by a lever 13 between its normal operative position shown in Figs. 1 and 3 and its inverted or measuring position shown in Fig. 6. A plurality of creasing devices 15 are adjustably mounted upon the bar 10, as by set screws 16, and each is adapted to cooperate with a creasing roll 17 adjustably mounted on a shaft 18 rotatably mounted in the uprights 12 and adapted to be rotated in any suitable manner (not shown). A suitable scale 21 is secured, as by hinges 22, to a bar 23 extending between the uprights 12.

The improved cutting device of the invention may comprise a holder 25 adjustably mounted upon the bar 10 and secured in adjusted position thereon, as by a set screw 26. The holder is provided with an integral arm 27 extending outwardly and downwardly therefrom. A stud 28 is secured in the arm 27 and is provided with a relatively large head 29 spaced from one side of the arm. A carrier 33 is pivotally mounted at one end upon the stud 28 between the arm 27 and the head 29 of the stud (Fig. 4). A spring 34 surrounds the stud 28 with one end engaging the head 29 and with its other end engaging the carrier 33. A stop 36 is pivotally mounted on a pin 37 upon the free end of the carrier 33 and is provided with a plurality of stop landings 39, 40 and 41 adapted for engagement with the head of an adjusting screw 42 threaded in the holder 25 and locked in adjusted position therein by a lock nut 43.

In the preferred construction the carrier is turned resiliently about the stud 28 towards the holder 25 by a spring 45 surrounding the stud 28 adjacent the outer face of the arm 27. One end of the spring 45 is fixed on a pin 46 on the holder 25 and its other end is fixed to a pin 47 upon the carrier 33 and spaced from the stud 28 on the side thereof remote from the free end of the carrier so as to create a moment about the stud 28 tending to urge the free end of the carrier towards the holder. A cutting disc 50 is fixed on a shaft 52 rotatably supported on roller bearings 53 in an opening 51 at an intermediate point on the carrier 33. The cutting disc 50 is adapted to cooperate with a cutting member 55 such as an annular rib projecting from a ring 56 adjustably mounted upon the shaft 18.

Figure 5:
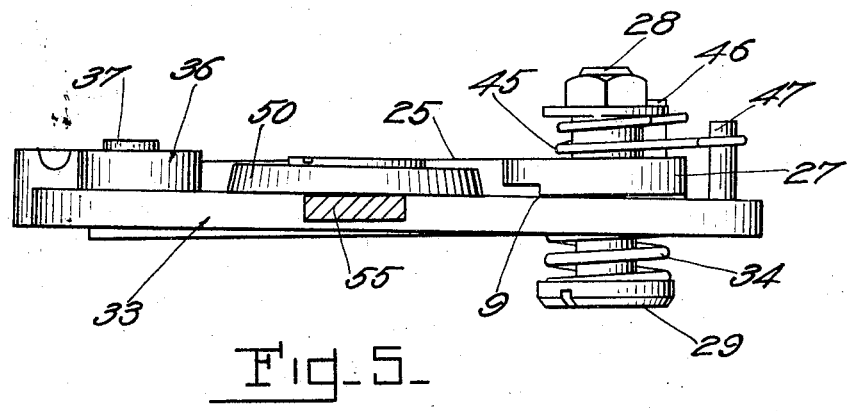
Fig. 5 is a section taken substantially on the line 5—5, Fig. 3.

In operation, the bar 10 is positioned as shown in Fig. 3 with the disc 50 overlapping the cutting member 55, the screw 42 being adjusted so as to provide the proper lap of the cutting disc 50 relative to the cutting ring 55 when the stop landing 39 engages therewith. When thus positioned the carrier 33 will act as a lever, having as a fulcrum an edge or shoulder 9 formed on the arm 27. The spring 34 acting against the carrier on one side of the fulcrum urges the cutting disc 50 on the carrier on the other side of the fulcrum laterally against the cutting member 55 as seen in Fig. 5. In other words to bring the disc 50 into overlapping operative engagement with the cutting member 55 it is necessary to turn the carrier 33 about the fulcrum against the resilient action of the spring 34. Stock is then passed between the creasing devices 15 and the creasing rolls 17 at which time it also passes between the cooperating cutting elements 50 and 55.

When it is desired to readjust the position of the cutting and creasing devices upon the bar 10, the latter is moved to its inverted position by turning the lever 13 and the stop 36 is moved to bring the landing 40 thereon in engagement with the head of the screw 42 thereby bringing the cutting disc 50 closely adjacent the scale 21 as shown in Fig. 6 to permit accurate adjustment of the cutting device.

When the cutting device has been secured in its adjusted position by the set screw 26, the stop 36 is moved to bring the landing 41 in engagement with the head of the screw 42 to move the cutting disc to its collapsed position as seen in Fig. 7. The bar 10 is then returned to its normal operative position, the stop 36 being moved to bring the landing 39 in engagement with the head of the screw 42 and the carrier 33 pivoted laterally about the shoulder 9 to bring the disc 50 in overlapping engagement against the member 55.

By pressing the cutting disc resiliently laterally against the ring 55 cutting of the stock entirely apart is assured. However, such an arrangement would not be practical for use in creasing machines on account of the necessary and numerous readjustments of the creasing units if it was not possible to move the disc to a collapsed position before moving the cutting device from its inverted to normal operative position. Otherwise, injury to the cutting edge of the disc might result by striking the cutting or shearing member cooperating therewith. The cutting device of the invention is constructed so that this adjustment may be made quickly without loss of the operator's time and without delay in the normal use of the creasing machine. The invention makes such an arrangement possible without interfering in any way with the relative adjustment of the creasing and trimming units on account of the position of the stud 28 outside the range of the creasing units. Thus, in Fig. 3, wherein the creasing device is shown diagrammatically in dotted lines, it will be noted that the stud 28 projects laterally in the rear of the creasing unit thereby making it possible to position the creasing unit relatively close to the cutting device.

What we claim is:

1. In a machine of the character described, in combination, a cutting member, a cutter holder, a cutter carrier movably mounted on said holder, a cutting disc rotatably mounted on said carrier and normally overlapping said member so as to cooperate therewith to shear stock passed therebetween, means for resiliently pressing said overlapping disc and member laterally against one another, and means for resiliently urging said carrier in a direction parallel to the plane of said disk away from said member and towards said holder.

2. In a machine of the character described, in combination, a shaft, a bar disposed parallel to said shaft, a cutting ring on said shaft, a cutter holder detachably secured to said bar and attachable thereto in a variety of positions longitudinally thereof, said bar being invertible to facilitate the setting of said holder, a cutting disc rotatably carried by said holder and normally overlapping said ring so as to cooperate therewith to shear stock passed between said shaft and bar, means for resiliently pressing said overlapping ring and disc laterally against one another, and means for withdrawing said disc from overlapping relationship to said ring.

3. In a machine of the character described, in combination, a cutting member, a cutter holder, a cutter carrier pivotally mounted at one end upon said holder, a cutting disc rotatably mounted on said carrier at an intermediate point thereof and normally overlapping said member so as to cooperate therewith to shear stock passed therebetween, means for resiliently pressing said carrier in a direction parallel to the plane of said disk away from said member and toward said holder, and an adjustable stop for controlling the overlapping relation of said member and disc.

4. In a machine of the character described, in combination, a cutting member, a cutter holder, a cutter carrier movably mounted on said holder, a cutting disc rotatably mounted on said carrier and normally overlapping said member so as to cooperate therewith to shear stock passed therebetween, means for resiliently pressing said overlapping disc and member laterally against one another, means for resiliently urging said carrier in a direction parallel to the plane of said disk away from said member and towards said holder, and an adjustable stop for controlling the overlapping relation of said member and disc.

5. In a machine of the character described, in combination, a cutter holder, a cutter carrier pivotally mounted at one end on said holder, a cutting member, a cutting disc rotatably mounted on said carrier and normally overlapping said disc, means for resiliently pressing said disc laterally against said member, means for resiliently urging the other end of said carrier in a direction parallel to the plane of said disk away from said members and towards said holder, and a stop movable on the free end of said carrier having a plurality of stop landings adapted for engagement with said holder.

6. In a machine of the character described, in combination, a cutter holder, a cutter carrier pivotally mounted at one end on said holder, a cutting member, a cutting disc rotatably mounted on said carrier and normally overlapping said disc, means for resiliently pressing said disc laterally against said member, means for resiliently urging the other end of said carrier in a direction parallel to the plane of said disk away from said member and towards said holder, a stop movable on the free end of said carrier having a plurality of stop landings adapted for engagement with said holder, and an adjustable screw in said holder adapted for engagement with said stop landings.

7. In a machine of the character described, in combination, a cutter holder, a stud fixed in said holder near one end thereof having a head spaced from one side thereof, a cutter carrier pivotally mounted on said stud, a cutting member, a cutter disc rotatably mounted in said carrier and normally overlapping said member so as to cooperate therewith to shear stock passed therebetween, and a spring surrounding said stud with one end engaging said head and its other end engaging said carrier and adapted to urge said disk laterally against said member.

8. In a machine of the character described, in combination, a cutter holder, a stud fixed in said holder near one end thereof having a head spaced from one side thereof, a cutter carrier pivotally mounted on said stud, a cutting member, a cutter disc rotatably mounted in said carrier and normally overlapping said member so as to cooperate therewith to shear stock passed therebetween, a spring surrounding said stud with one end engaging said head and its other end engaging said carrier and adapted to urge said disk laterally against said member, and a spring surrounding said stud on the other side of said holder with one end fixed to said holder and the other end fixed to said carrier at a point spaced from said stud and adapted to urge said carrier in a direction parallel to the plane of said disk away from said member and towards said holder.

9. In a machine of the character described, in combination, a cutter holder, a stud fixed in said holder near one end thereof having a head spaced from one side thereof, a cutter carrier pivotally mounted on said stud, a cutting member, a cutter disc rotatably mounted in said carrier and normally overlapping said member so as to cooperate therewith to shear stock passed therebetween, a spring surrounding said stud with one end engaging said head and its other end engaging said carrier and adapted to urge said disk laterally against said member, a spring surrounding said stud on the other side of said holder with one end fixed to said holder and the other end fixed to said carrier at a point spaced from said stud and adapted to urge said carrier in a direction parallel to the plane of said disk away from said member and towards said holder, and an adjustable stop on the free end of said carrier adapted for engagement with said holder.

10. In a machine of the character described, in combination, a cutter holder, a stud fixed in said holder near one end thereof having a head spaced from one side thereof, a cutter carrier pivotally mounted on said stud, a cutting member, a cutter disc rotatably mounted in said carrier and normally overlapping said member so as to cooperate therewith to shear stock passed therebetween, a spring surrounding said stud with one end engaging said head and its other end engaging said carrier and adapted to urge said disk laterally against said member, a spring surrounding said stud on the other side of said holder with one end fixed to said holder and the other end fixed to said carrier at a point spaced from said stud and adapted to urge said carrier in a direction parallel to the plane of said disk away from said member and towards said holder, an adjustable stop on the free end of said carrier adapted for engagement with said holder, and an adjustable screw in said holder adapted for engagement with said stop.

11. In a machine of the character described, in combination, a cutting member, a cutter holder, a cutter carrier movably mounted on said holder, a cutting disc rotatably mounted on said carrier and normally overlapping said member so as to cooperate therewith to shear the stock passed therebetween, a fulcrum for said carrier on said holder, and resilient means resisting movement of said carrier laterally about said fulcrum to bring said disc into engagement with said member.

In testimony whereof we affix our signatures.

JOHN T. ROBINSON.
HORACE F. COOK.